United States Patent
Bergman

[15] 3,670,642
[45] June 20, 1972

[54] COMBINATION TOASTING AND BUTTERING APPARATUS

[72] Inventor: Robert N. Bergman, 1766 Molino, Long Beach, Calif. 90804
[22] Filed: Sept. 14, 1970
[21] Appl. No.: 71,863

[52] U.S. Cl..............................99/329 RT, 83/372, 99/353, 99/355, 99/400, 118/2, 239/274
[51] Int. Cl..........................................................A47j 37/06
[58] Field of Search..................118/2; 83/372; 99/353, 352, 99/355, 400, 329 RT; 239/274

[56] References Cited

UNITED STATES PATENTS

| | | | |
|---|---|---|---|
| 1,633,391 | 6/1927 | Beskin | 99/355 |
| 2,027,002 | 1/1936 | Spang | 99/355 X |
| 2,109,796 | 3/1938 | Hirschenfeld | 99/355 UX |
| 2,337,117 | 12/1943 | Lloyd | 99/355 X |
| 2,414,139 | 1/1947 | Cherry | 99/329 X |
| 2,465,577 | 3/1949 | Cox | 99/329 X |
| 2,918,860 | 12/1959 | Matzenauer | 99/329 X |
| 3,078,821 | 2/1963 | McEwen | 118/2 |
| 3,156,178 | 11/1964 | Kormos | 99/355 |
| 2,828,714 | 4/1958 | Sandberg | 118/2 |

Primary Examiner—Billy J. Wilhite
Attorney—Fulwider, Patton, Rieber, Lee & Utecht

[57] ABSTRACT

A combination toasting and buttering apparatus including a housing formed with a passage leading from an upper heating compartment to a lower buttering compartment. Heating means is disposed in the upper compartment and support means is provided for supporting a slice of bread disposed in heat exchange relationship with the heating elements. A shortening applicator is disposed in the lower compartment for applying shortening to toast as it passes therethrough and advancing means is provided for advancing the bread slice from the upper compartment to the lower compartment. Actuating means is provided for actuating the applicator as the bread is advanced to the lower compartment for applying shortening to the bread slice as it is passed through the lower compartment whereby a slice of bread may be introduced into the upper compartment where it is toasted and then automatically advanced to the lower compartment where the applicator will automatically apply shortening thereto.

6 Claims, 4 Drawing Figures

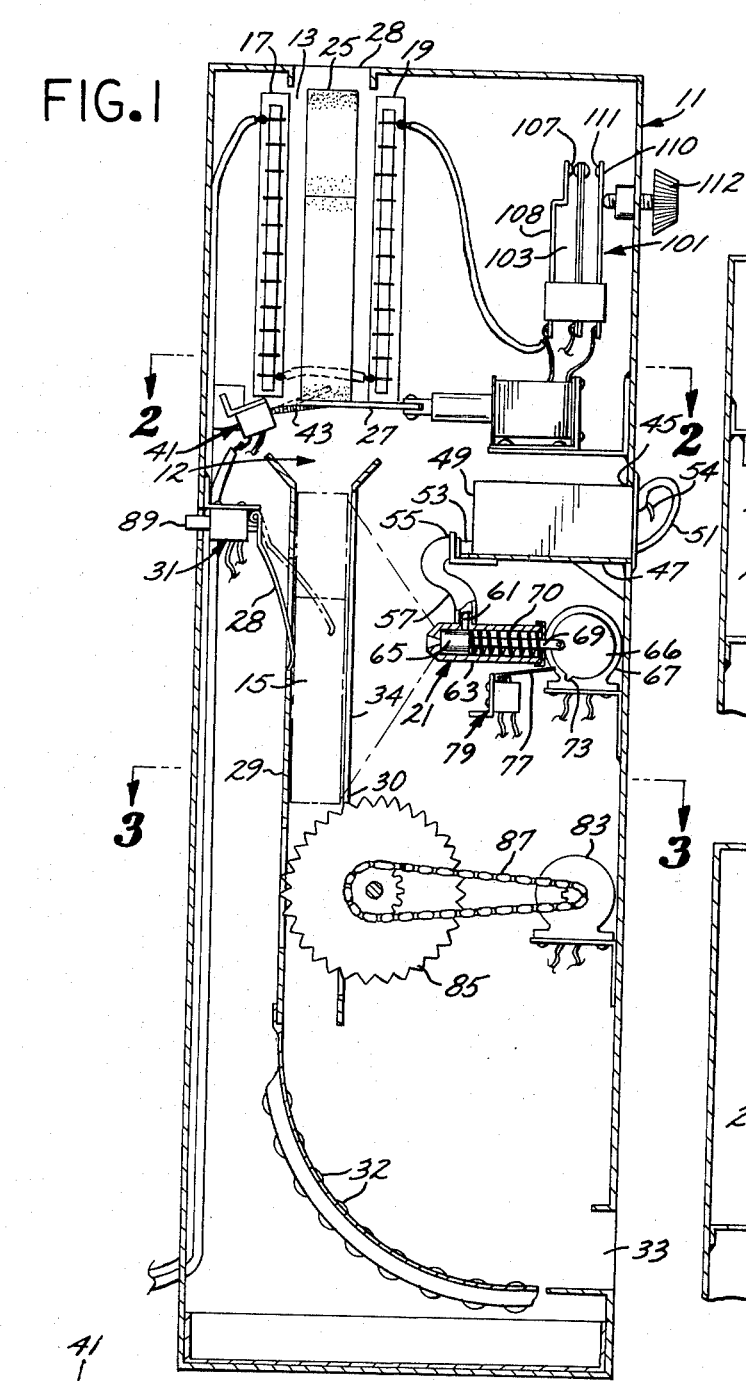

COMBINATION TOASTING AND BUTTERING APPARATUS

BACKGROUND OF THE INVENTION

1. Field of the Invention

The present invention relates generally to toasters and more particularly to a toaster which provides for automatically buttering the toast after toasting thereof is completed.

2. Description of the Prior Art

Numerous toasting devices have been proposed which include a pop-up type mechanism having a shortening applicator which applies shortening to the toast as it is ejected upwardly out of the heating compartment. Toasters of this type suffer the shortcoming that the shortening is applied to the toast at a point above the heating compartment thereby resulting in any excess shortening dripping downwardly into the heating compartment where it may be baked onto the heating elements thereby causing burning and, consequently, smoking of the toaster.

SUMMARY OF THE INVENTION

The combination toasting and buttering apparatus of present invention is characterized by a housing formed with a passage including an upper heating compartment having heating elements disposed therein and a lower buttering compartment where application of shortening may take place. An applicator is mounted in the housing for spraying shortening onto the toast while it is in the lower compartment. Support means is provided for supporting the bread slice in the upper compartment and actuating means is provided for actuating the applicator when the bread is advanced to the lower compartment to thereby apply shortening to the toast.

An object of the present invention is to provide a combination toasting and buttering apparatus of the type described wherein dripping of excess shortening onto the heating elements is avoided.

Another object of the present invention is to provide a combination toasting and buttering apparatus of the type described which automatically toasts, butters and slices the bread.

These and other objects and the advantages of the present invention will become apparent from a consideration of the following detailed description when taken in conjunction with the accompanying drawing.

DESCRIPTION OF THE DRAWING

FIG. 1 is a vertical sectional view of a combination toasting and buttering apparatus embodying the present invention;

FIG. 2 is a partial horizontal sectional view taken along the line 2—2 of FIG. 1;

FIG. 3 is a partial horizontal sectional view taken along the line 3—3 of FIG. 1; and FIG. 4 is a schematic diagram of an electrical circuit which may be utilized with the combination toasting and buttering apparatus shown in FIG. 1.

DESCRIPTION OF THE PREFERRED EMBODIMENT

Referring to FIGS. 1 and 4, the combination toasting and buttering apparatus of present invention includes, generally, a housing 11 which defines a generally vertical passage 12 defining an upper compartment 13 and a lower compartment 15. Still speaking generally, disposed within the upper compartment is a pair of heating elements 17 and 19 and mounted in the lower compartment is a shortening applicator 21 for spraying shortening on a slice of toast 25 as it passes thereby. A support frame in the form of a horizontal fork 27 is mounted from the housing for maintaining the bread slice 25 in the compartment 13 for a predetermined time to be toasted and is then retracted to allow the toast to fall downwardly and engage an arm 28 of an actuating control or switch, generally designated 31, which actuates the applicator 21 to spray shortening thereon.

Referring to FIG. 1, the upper end of the passage 12 is defined by an inlet 28 formed in the housing 11 and the upper compartment 13 thereof is formed between the spaced apart heating elements 17 and 19. The lower compartment 15 is formed by a pair of spaced apart vertically extending walls 29 and 30, the wall 30 having a window 34 formed therein for passage of the shortening sprayed from the applicator 21. The lower extremity of the wall 29 is curved forwardly and has a plurality of plastic bearings 32 mounted therein for directing the toast 25 toward the outlet 33 defined by the lower end of the passage 12.

Referring to FIGS. 1 and 2, the supporting fork 27 is mounted on the retractable armature 35 of an electromagnetic solenoid 37.

An actuating switch, generally designated 41, is mounted from the housing 11 and includes an actuating arm 43 which projects upwardly above the plane of the support fork 27 to be engaged by the bottom edge of the toast 25 supported on such fork to be closed thereby to energize the heating elements 17 and 19.

Still referring to FIG. 1, the housing 11 is formed in one side with a shortening tank opening 45 which has an inwardly projecting shelf 47 disposed therebelow for receipt of a butter tank 49. The butter tank 49 includes a handle 51 on one end thereof and an outlet nipple 53 on the opposite end thereof. A poppet (not shown) is provided for closing the outlet nipple 53 and a trigger 54 is provided in the handle 51 and is coupled to such poppet for shifting such poppet to its open position after the tank 49 has been installed. A mounting bracket 55 is supported from the inner extremity of the tray 47 for receipt of one end of a flexible conduit 57 that leads downwardly to an inlet 61 in the side wall of a spray nozzle 63.

The spray nozzle 63 includes a piston 65 therein which is connected on its rear extremity with a cam 66 carried on the shaft of a drive motor 67 by means of a connecting link 69 whereby rotation of such motor will drive the cylinder 65 forwardly and rearwardly in such nozzle. The piston 65 is biased forwardly in the nozzle 63 by means of a coil spring 70 whereby it will be maintained fully telescoped to the orifice end of such nozzle when the drive motor 67 is deenergized.

A prong 73 projects radially from the cam 66 for engaging the actuating arm 77 of a holding relay 79 which controls current to a cutter drive motor 83 that is coupled with a cutting blade 85 by means of a drive chain 87.

Referring to FIG. 1, the actuating switch 41 includes a manual switch button 89 for selectively opening the circuit to the applicator motor 67 to prevent application of shortening.

A crumb tray 90 is located in the bottom of the housing 11 for catching any crumbs that fall downwardly past the wall 29.

Referring to FIG. 4, the toaster actuating switch 41 includes a micro-switch 95 coupled with the actuating arm 43 and a thermostatic switch 97 disposed in heat exchange relationship with the heating element 19. A timing switch, generally designated 101, and incorporating a thermostatic blade 103, is connected on its fixed end with the toaster actuating switch 41 by means of an electrical lead 105 and has its free end normally engaged with a first contact 107 which is connected in series with the heating elements 17 and 19. The free end of such timing blade 103 is engageable upon heating thereof with a second contact 111 which is connected with the support fork solenoid 37. Referring to FIG. 1, the contacts 107 and 111 are carried on respective resilient electrically conductive tines 108 and 110 and the tine 110 is engaged by the inner end of a toast setting knob 112.

Still referring to FIG. 4, the applicator control 31 includes a switch 106 operated by the manual button 89 and also includes a micro-switch 108 connected with the actuating arm 28 projecting into the toast passage 12, such micro-switch being connected in series with such manual switch.

Connected in parallel with the switches 106 and 108 is the holding relay 79 which has a first switch 115 in series therewith for providing current to such relay itself and a second switch 117 mechanically coupled thereto for controlling current to the cutter drive motor 83.

In operation, the combination toasting and buttering apparatus is connected with a power source 121 and a bread slice 25 to be toasted may be inserted downwardly into the upper toasting compartment 13 and have its lower edge engage the toaster actuating arm 43 and to come to rest on the horizontally extending support fork 27. Downward pivoting of the actuating arm 43 will close the micro-switch 95 to complete a circuit through the thermostatic blade 103 and heating elements 17 and 19 to initiate heating of the toast and consequent toasting thereof. As the heating elements 17 and 19 effect heating of the bread slice 25, the thermostatic switch 97 will be heated to warp to its closed position with its free end making contact with the contact 98. When heating of the bread slice 25 has been completed, the thermostatic blade 103 will be heated sufficiently to warp to disengage its free end from the contact 107 and engage the contact 111 to complete a circuit through the fork retracting solenoid 37 to thereby retract the fork 27 and enable the bread slice 25 to drop downwardly to the compartment 15.

It is noted that the butter tray 49 is disposed in heat exchange relationship with the heating elements 17 and 19 so the butter therein will be heated by such elements to maintain it warm and fluid.

As the toasted slice drops downwardly, it will engage the flapper arm 28 to close the associate switch 108 and, assuming the manual butter selector switch 106 is closed, a circuit will be momentarily completed through an applicator drive motor 67 to cause the cam 66 to complete a full revolution thereby driving the piston 65 rearwardly during the first half cycle to uncover the inlet 61 and enable shortening to pour into the nozzle 63 and to then drive such piston forwardly during the second half cycle to close the inlet 61 and spray shortening outwardly against the toast slice 25 while it is in its broken line position shown in FIG. 1.

As the cam 66 completes approximately a third of a revolution, the cam prong 73 will engage the actuating arm 77 of the holding relay 79 to close the actuating switch 115 and energize such relay 79. Energization of the relay 79 will hold the switch 115 closed and will close the switch 117 and maintain it closed until the relay 79 is de-energized. Closure of the switch 117 energizes the cutter drive motor 83 to commence rotation of the cutting blade 85 to draw the toast slice 25 downwardly while slicing it longitudinally. It will be realized that actuation of the applicator 21 and subsequent energization of the cutter drive motor 83 may take place relatively rapidly so the toast slice 25 is buttered and sliced as it falls downwardly through the lower compartment 15. As the toast 25 drops downwardly beyond the cutter blade 85, its lower extremity will engage the bearings 32 and be directed outwardly through the exit 33 where it may be received in a tray (not shown) disposed adjacent thereto.

Immediately after the cutting step has been completed, the thermostatic switch 97 will have cooled sufficiently to open thereby de-energizing the relay 79 and enabling the switches 115 and 117 to open to discontinue operation of the cutter drive motor 83.

If at any time it is desirable to obtain dry or unbuttered toast, the manual switch button 89 may be switched to open the switch 106 so the applicator drive motors 57 will not be energized when the toast 25 passes downwardly through the lower compartment 15.

When it is desirable to wash the tray 49 it may be removed and filled with warm soapy water. The trigger will be positioned to maintain the outlet nipple 53 closed until such nipple is inserted in the hose end 55. Such trigger 54 may then be actuated to open the outlet nipple 33 and the apparatus then cycled a couple of times to spray warm soapy water through the nozzle 63 to clean it.

It should be noted that the general arrangement described hereinabove may be provided for simultaneously toasting any number of slices of bread.

From the foregoing it will be apparent that the combination toasting and buttering apparatus of present invention provides for automatic and convenient toasting and buttering of a slice of bread while preventing the shortening from dripping downwardly on the toasting elements to avoid foiling thereof.

Various modifications and changes may be made with regard to the foregoing detailed description without departing from the spirit of the invention.

I claim:

1. Combination toasting and buttering apparatus comprising:
    a housing formed with a vertically extending passage defining a path having an inlet, an upper compartment, a lower compartment and an outlet;
    heating means disposed in said upper compartment;
    retractable support means disposed below said upper compartment and normally projecting into said passage for blocking the downward path of a slice of bread disposed in heat exchange relationship with said heating means and retractable to a retracted position to clear said downward path;
    applicator means disposed in said lower compartment and including atomizing means for spraying shortening on a slice of toast as it passes thereby;
    release means engaging said support means for retracting said support means from said passage to enable said slice to pass thereby;
    return means for automatically returning said support means to its normal position after said slice has passed thereby; and
    actuating means for automatically actuating said applicator means when toast is advanced to said lower compartment whereby a slice of bread may be placed in said upper compartment for toasting and said release means subsequently actuated to retract said support means so the toasted bread will be advanced to said lower compartment and said applicator means actuated to apply shortening to the toast.

2. Combination toasting and buttering apparatus as set forth in claim 1 that includes:
    a cutting device mounted in said housing below said applicator means and including a cutting blade projecting into said passage and cutter drive means for driving said blade.

3. Combination toasting and buttering apparatus as set forth in claim 1 wherein:
    said support means includes a retractable support frame, electrical coil means for retracting said frame; and
    said release means includes electrical switch means connected in circuit with said electrical coil means and responsive to a predetermined temperature to actuate said coil means.

4. Combination toasting and buttering apparatus as set forth in claim 1 wherein:
    said application means includes a spray nozzle for spraying shortening on said toast, electric drive means for pressurizing shortening in said nozzle to spray said shortening on said toast; and
    said actuating means includes an electric switch connected in circuit with said drive means and having an actuating arm projecting into said passage to be engaged by said toast as it passes therethrough in advancing from said upper compartment to said lower compartment.

5. Combination toasting and buttering apparatus as set forth in claim 1 wherein:
    said applicator means includes a spray nozzle formed with a piston chamber having a spray orifice in one end thereof, a piston in said piston chamber, a drive motor connected with said piston and connected with said actuating means to be actuated thereby when said toast is advanced to said lower chamber.

6. Combination toasting and buttering apparatus as set forth in claim 5 wherein:
    said piston is of sufficient length to, when fully extended, project fully to the orifice end of said chamber to fully expel shortening from said chamber.

* * * * *